Jan. 30, 1945. K. G. MINGE ET AL 2,368,371
METHOD OF RECLAIMING WASTE ASPHALTIC MATERIAL
Filed Feb. 19, 1941
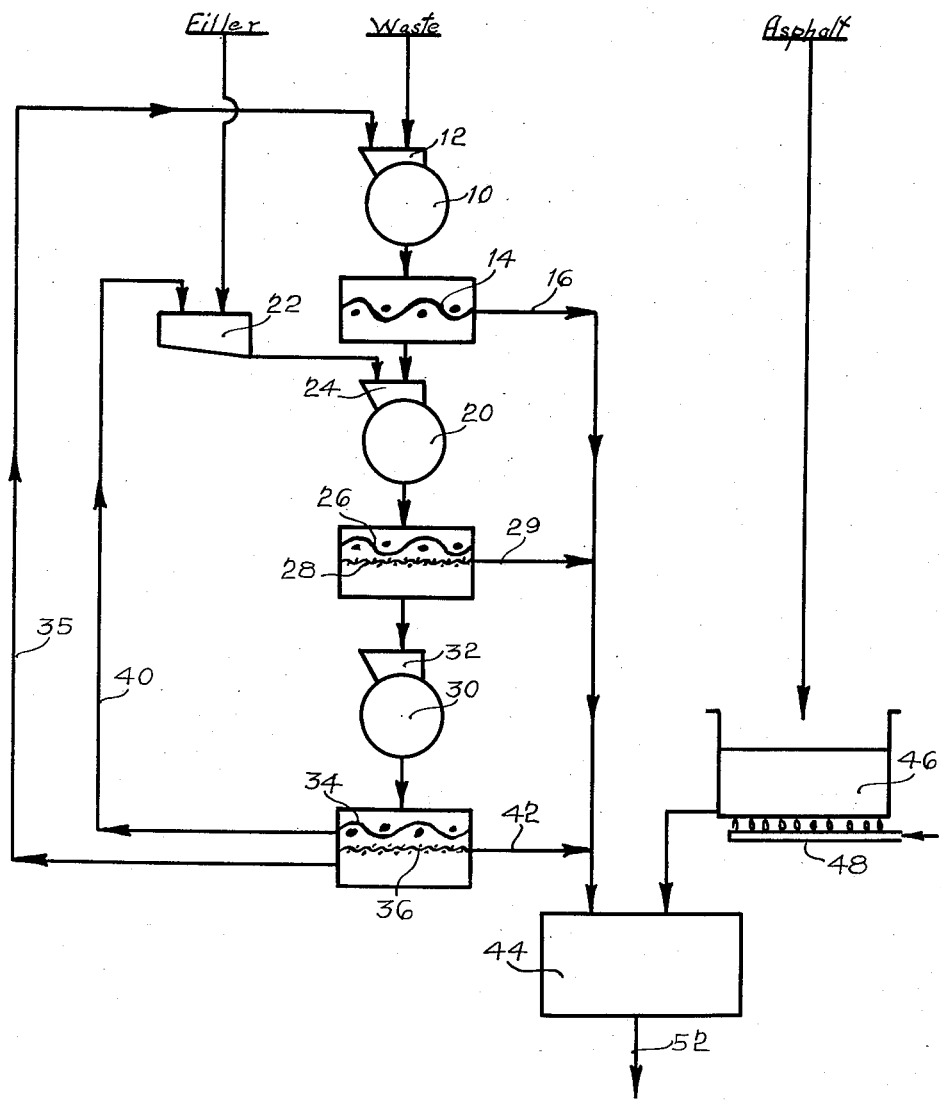
INVENTOR
Kenneth Guy Minge and Charles E. Minge
BY Henry G. Dybrig
THEIR ATTORNEY Patented Jan. 30, 1945

2,368,371

UNITED STATES PATENT OFFICE 2,368,371

METHOD OF RECLAIMING WASTE ASPHALTIC MATERIAL

Kenneth Guy Minge, Franklin, and Charles E. Minge, Dayton, Ohio

Application February 19, 1941, Serial No. 379,620

16 Claims. (Cl. 106—273)

This invention relates to the manufacture of asphalt products and more particularly to a process of reclaiming waste materials resulting from the manufacture of asphalt products.

This is a continuation-in-part of our copending application Serial No. 334,954, filed May 13, 1940, for Process of reclaiming bituminous waste products, wherein the shingles incorporating reclaimed waste material is claimed.

In the manufacture of shingles from asphalt and the manufacture of prepared roofing there is a large amount of waste material, such as punchings, side trim, seconds and thirds, torn pieces and defective strips that have not been utilized; but instead, thrown on the scrap heap and burned. The composition of this waste material may include a felt base that may be composed of vegetable or animal fibers matted together, so as to form a mat which may be saturated or coated with asphalt, tar or other bituminous products. On top of this mat and intimately associated therewith, may be a layer of asphalt, having intermixed therewith a mineral filler compound to the consistency of a mastic. In the topmost surface of this mastic may be embedded closely spaced granules of crushed slate, silica, mica or other granular matter forming an abrasive and weather resistant surface.

A certain amount of waste accumulates in the manufacture of asphalt sheet material and the like. This waste material may consist of trimmings, pieces removed from strips of material so as to form lengths simulating shingles and some of the waste material may result from rejects and seconds. Numerous attempts have been made to reclaim one of the ingredients of the waste material. Some attempts have been made to reclaim the asphalt, other attempts have been made to reclaim the fibers. Furthermore, attempts have been made to manufacture non-analogous materials from the waste material, as for example, filler expansion strips used between the joints formed in concrete pavement. These attempts have met with limited commercial success. In most of the factories manufacturing composition shingles and the like, the waste material is hauled to the dump and burned. Fires have been known to continue to burn this asphalt waste material over a long period of years. As a matter of fact, the waste material constitutes a fire hazard, in addition to the loss of valuable materials.

There are a number of plants throughout the country manufacturing shingles. The annual cost of raw materials going into the waste material at each of these plants amounts to huge sums of money. In spite of the fact that this is a comparatively old industry, no one has found a commercially successful solution for reclaiming all of the waste material.

An object of the present invention is to disintegrate the scrap material and mix this disintegrated scrap material with asphalt, so as to produce a mass of material which may be utilized in the manufacture of asphalt shingles, roofing material and other asphalt products.

Another object of this invention is to provide a filler material for shingles which includes asphalt having intermixed therewith granular substances such as slate, mica, silica, crushed limestone and the ilke.

Another object of this invention is to reclaim waste material accumulating as a result of the manufacture of asphalt products such as asphalt shingles, asphalt roofing material, asphalt siding and the like.

Another object of this invention is to progressively reduce the waste material into comminuted material.

Another object of this invention is to utilize the reclaimed waste material in the manufacture of asphalt products, such as asphalt shingles, asphalt sheet roofing material, asphalt siding and other asphalt products.

Another object of this invention is to incorporate into the process the use of a filler material used in reducing the waste material into a sufficiently finely comminuted state, which filler material may be reclaimed and reused.

Another object of this invention is to progressively break down the waste material in successive steps into a sufficiently finely comminuted state, progressively separating the comminuted material from the coarser material between the successive steps.

Another object of this invention is to progressively reduce the waste material into finely comminuted material and remove the greater portion of the asphalt in the early stages of the process.

Another object of this invention is to progressively reduce the waste material into sufficiently finely comminuted material by first removing the greater portion of the asphalt material and the granular material, then adding a filler material to the residue, which filler material aids in the reduction of the fibrous material found in the waste material.

Another object of this invention is to incorporate the sufficiently finely comminuted material into molten asphalt, agitating the same so as to form a homogeneous mass and utilizing this mass as a layer in roofing material or other asphalt products.

Another object of this invention is to progressively reduce the waste material into sufficiently finely comminuted material by the use of hammer mills and the use of a filler material aiding the hammer mills in the reduction process.

Another object of this invention is to progressively reduce the waste material, so that the final product consists of finely comminuted waste material and a small percentage of larger pieces consisting of the toughest material incorporated in the production of the waste material, which pieces are sufficiently small to be satisfactory for reuse.

Other objects and advantages reside in the construction of parts, processes disclosed and mode of operation, as will become more apparent from the following description.

The single figure shown in the drawing illustrates schematically the several steps used in the manufacture of asphalt materials having incorporated therein reclaimed waste material.

The waste material resulting from the manufacture of asphalt composition shingles, asphalt roofing material and other asphalt products is reclaimed by the following process. The waste material is progressively shredded or reduced and graded. After each stage in the operation, excepting the last, the coarse aggregate is subjected to further shredding or reduction and the fine material is advanced to the ultimate reclaiming stage. In order to facilitate the reduction of the coarse aggregate, a suitable filler material is added to the coarse aggregate in the subsequent stages. The output of the final stage is separated. After the final reduction of the waste material, the filler material is separated from the waste material and may be reused. The waste material that has been separated after each stage of the earlier stages and the waste material found after the final stage is added to molten asphalt in the ultimate stage. This molten asphalt, having the waste material therein, is agitated violently so as to thoroughly intermix the reclaimed waste material with the asphalt and so as to disintegrate the fibrous material into shreds or fibrillas. The asphalt, together with the waste material added thereto, is then ready for application to new asphalt roofing material and the like. The asphalt, having added thereto the disintegrated waste material, is well suited for use in the intermediate layer of the shingles, as clearly shown in our copending application Serial No. 334,954.

As the process disclosed herein has been carried out by the use of Stedman's hammermills, as far as the several reducing stages are concerned, the process will be described by referring to these mills. Obviously, any other suitable type of mills or devices for reducing the waste material may be used within the purview of this invention. Reference to the Stedman's hammermills is merely made for the purpose of convenience.

Referring to the drawing, the reference character 10 is used to indicate schematically a Stedman type A hammermill. This mill may be provided with a coarse screen, as for example, a 1½" screen, as is well known to those skilled in the art. It may be driven at a speed of approximately 1800 R. P. M. Any other suitable speed may be selected, depending upon the type of equipment used, the quality of the waste material, the rate of reduction and numerous other factors. The waste material is supplied to the hopper 12 in any suitable manner. The output from this hammermill is graded. For the purpose of illustration, the output may be graded by a #6 sieve 14. The finely comminuted material passes through this sieve. This sieve, as well as the other sieves to be described later, may be mounted for reciprocatory or vibratory movement, or the sieves may be rotary, as is well known to those skilled in the art. A large percentage of the asphalt material in the waste material passes through the sieve and practically all of the granular material found in the waste material, such as slate, mica and other filler material, also passes through the sieve 14.

The material that passes through the sieve 14 may be fed through a suitable conduit 16 to the ultimate stage in the process which will be described more fully later. The coarse material that passes over the sieve 14 contains most of the fibrous material with a small quantity of asphalt and a trace of slate, et cetera. This coarse material is fed to a second hammermill 20. This hammermill may also be driven at a speed of 1800 R. P. M. or at any other suitable speed; but instead of a coarse screen, a finer screen is used, as for example, a ⅝" screen may be used in this hammermill. It has been found that the coarse aggregate coming from the first hammermill, if it is fed to the second hammermill having a finer screen, has a tendency to clog the hammermill. Most of the material found in this coarse aggregate includes fibrous material, which is extremely tough and hard to reduce. When this material is fed to the second hammermill, it has a tendency to generate heat, softening or partially melting the asphalt content. This causes the waste material to clog the screen and to choke the hammermills.

In order to overcome this difficulty, a finely comminuted mineral filler material, such as limestone, passing through a fine sieve, as for example a 40 mesh, is added and intermixed with the coarse aggregate delivered from the first mill. This filler material merely enters into the operation of reducing the waste material, without necessarily becoming a part thereof. This filler material functions as a lubricant, in that it keeps the parts of the hammermill coming in contact with the waste material smooth and slippery. The limestone or filler material is fed from a suitable hopper 22 to the hopper 24 of the hammermill 20.

The output of the hammermill 20 is graded first by passing over the coarse sieve 26, which, for the purpose of illustration, may be a 6 mesh sieve. The material that fails to pass through this sieve is advanced to a succeeding hammermill 30, which will be described more fully later. The finely comminuted material passing through the sieve 26 is passed over a fine sieve 28. For the purpose of illustration, this may be an 18 mesh sieve. The material that fails to pass through the sieve 28 is ready for the ultimate stage in the process, which will be described more fully later. The material that passes through the sieve 28 is fed into hopper 32 of the mill 30. Thus, it is seen that the coarse aggregate output of the mill 20 and the extremely fine material that includes the filler material or the lubricant are fed to the mill 30.

This mill 30 may be provided with a much finer screen, as for example, a ¼" or ⅛" screen. Furthermore, it is preferable to use a high speed mill for this operation. For example, it may have a speed of 3500 R. P. M. It may be an air mill, that is, an air cooled mill, wherein air is forced through the mill during the grinding operation to cool the ingredients.

The output of the hammermill 30 is satisfactory for further use without further grading. In the drawing disclosed herein, the output from this mill is passed over a coarse screen 34, so that if it is desirable to utilize the coarser material emanating from this mill, which includes the tougher fibrous material, for some other purpose than to be used in the ultimate stage of the process disclosed herein, these coarse pieces, which represent only a very small percent of the total waste material reclaimed, may be more valuable in the manufacture of paper to be used as base stock for shingles and the like than for use in the ultimate stage. This depends entirely upon circumstances, the policy of the firm reclaiming the waste material and the available outlets for the waste material.

The coarse material may be returned to the first stage for further reduction through the conduit 35. The material passing through the screen 34 is also passed over a screen 36, which may be another 18 mesh screen. This separates the filler material from the waste material, there being a small percentage of waste material in the filler material. This filler material may be fed through a conduit or elevator 40, where it is returned to the hopper 22 for reuse.

The finely comminuted material supplied through the conduit 16 from the first stage, the conduit 29 from the second stage and the conduit 42 from the third stage is supplied to a large vat 44. This vat contains molten asphalt supplied from a suitable reservoir 46, heated by a suitable heating device 48. The vat 44 may also be heated. The waste material coming from the several mills and the asphalt flowing from the reservoir 46 are violently agitated while in the vat 44. This agitation mixes the waste material very thoroughly with the molten asphalt. Furthermore, this violent agitation disintegrates the pieces of fibrous material into fine fibers or fibrillas. During the operation, foam forms immediately after the waste material is added to the vat 44. This foam is believed to be caused by the alum content in the base sheet used in the manufacture of shingles and the like. Upon being agitated, the foam disappears, the alum evidently being distributed uniformly in the contents of the vat 44. The contents of the vat 44, after being thoroughly mixed, may be drained through a suitable drainage duct 52 for use in the manufacture of new shingles, as disclosed in our copending application Serial No. 334,954. The comminuted material may accumulate, and, if desirable, may be stored for a reasonable period of time before being added to the molten asphalt in the vat 44.

The mixture resulting from the ultimate step may be passed through a suitable mill or grinder to grind or comminute the granular material, which for the most part has been separated from the coarse aggregate in the first stage.

For the purpose of illustration, one batch of material will be traced through the process. As far as the quantities set forth are concerned, these depend entirely upon the type of material, the type, the setting and the manipulation of the equipment.

For the purpose of illustration, waste material consisting of 50 parts by weight of waste material resulting from the manufacture of shingles and 21 parts by weight of scrap shingles will be traced through the process. Some of the largest pieces were broken, in order to accommodate the first mill. The opening in this mill was too small to accommodate the widest pieces. Hence, these were broken. This waste material was fed to the first hammermill having a 1½" screen. It was found that approximately 59%, of the output of the first hammermill passed through the 6 mesh screen and the remainder, about 41%, constituting the coarse aggregate, did not pass through the screen. This coarse aggregate was then mixed with finely comminuted limestone, which limestone passed through a 40 mesh screen. The weight of this filler material, consisting of limestone, was equal to one-half the weight of the coarse aggregate, so that the material fed to the second hammermill consisted of 66⅔% waste material and 33⅓% of filler material. Approximately 58% of the output of the second hammermill passed through the 6 mesh screen and 42% constituted the coarse aggregate. The size of this coarse aggregate, however, was greatly reduced from the size of the coarse aggregate resulting from the first operation, in that the second mill has approximately a ⅝" screen and the coarse aggregate resulting from the second hammermill passed through this screen. The comminuted material passing through the 6 mesh screen included most of the filler material, excepting a little filler material which adhered to or was embedded into the coarse aggregate. This coarse aggregate, having added thereto an equal amount of filler material, was fed to the third hammermill. This mill had a ⅛" screen and had a speed of approximately 3500 R. P. M. Air was forced through the ingredients during the reducing operation, so as to prevent the ingredients from reaching a temperature which would melt or greatly soften the asphalt content of the waste material. The output of this mill was satisfactory for mixing with molten asphalt. For the purpose of analysis, it was found that 14% failed to pass through the 6 mesh screen and 86% passed through the 6 mesh screen. The material that failed to pass through the 6 mesh screen was light and fluffy. Approximately 40% of this material constituted rag content and the balance consisted of paper fibers or paper pulp, both the rag content and the paper pulp being coated with a thin coating of asphalt. The finely comminuted material derived from the first stage, the material passing through the 6 mesh screen but failing to pass through the 18 mesh screen resulting from the second stage and all of the material resulting from the third stage, excepting the filler material which passed through the 18 mesh screen, was then ready for the next operation. In the batch traced through the several stages, no attempt was made to further reduce the coarse material derived from the third hammermill, as the entire output was satisfactorily reduced.

One part of the comminuted waste material reduced in the several stages as described above, was added to four parts of molten asphalt having a temperature of 500° F. The molten asphalt and the waste material were agitated violently for a period of time sufficiently long to disintegrate the waste material and so as to eliminate the foam that formed on the batch immediately after the waste material was added to the molten asphalt. The ingredients were then ready to be used in the manufacture of shingles, roofing material or any other suitable asphalt product.

The above has been given merely for the purpose of illustration. The percentages of finely comminuted material and coarse aggregate resulting from the several stages will depend upon the mode of operation, the type of waste material and the temperature of the air. If it is extremely cold, the material is more easily comminuted than it is in hot weather.

Instead of utilizing three hammermills, more or less mills may be used, depending upon numerous factors. Furthermore, for some types of installation, it may not be absolutely essential to grade the output of each mill. For some grades of shingles and the like, mineral filler material is added to at least one layer. When using the reclaimed waste material in this type of a shingle, it is unnecessary to separate the filler material from the comminuted waste material resulting from the final stage.

"Filler material," as used in the claims, is used to designate any material that may be added to the coarse aggregate to prevent the asphalt from adhering to the working parts of the mills and to prevent the waste material from clogging the mills. Such filler material may consist of limestone, talc, pulverized slate, fine silica or any other suitable material.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. The method of reclaiming waste material resulting from the manufacture of asphalt shingles, asphalt roofing and other fibrous materials including asphalt, including the steps of shredding the waste material, comminuting the shredded material, intermixing the comminuted material with melted asphalt and violently agitating the mixture, so as to disintegrate the waste material and to mix thoroughly the ingredients of the waste material with the asphalt, said violent agitating extending over a period of sufficient duration to eliminate objectionable scum or foam, and adding a filler material to produce a mastic of the desired constituency.

2. The method of reclaiming waste material resulting from the manufacture of asphalt shingles, asphalt roofing and other fibrous materials including asphalt, including the steps of intermixing the waste material with melted asphalt, and violently agitating the mixture so as to disintegrate the waste material and to mix thoroughly the ingredients of the waste material with the asphalt, said agitating continuing for a period of sufficient duration to eliminate objectionable scum or foam.

3. The method of reclaiming waste material resulting from the manufacture of asphalt shingles, asphalt roofing and other fibrous materials including asphalt, including the steps of shredding the waste material, intermixing the shredded waste material with melted asphalt, and violently agitating the mixture so as to disintegrate the waste material and to mix thoroughly the ingredients of the waste material with the asphalt, said agitating continuing for a period of sufficient duration to eliminate objectionable scum or foam.

4. The method of reclaiming waste material resulting from the manufacture of asphalt shingles, asphalt roofing and other fibrous materials including asphalt, including the steps of comminuting the waste material, intermixing the comminuted material with melted asphalt, and violently agitating the mixture so as to disintegrate the waste material and to mix thoroughly the ingredients of the waste material with the asphalt, said agitating continuing for a period of sufficient duration to eliminate objectionable scum or foam.

5. The method of reclaiming waste material resulting from the manufacture of asphalt shingles, asphalt roofing and other fibrous materials including asphalt, including the steps of shredding the waste material, intermixing the shredded waste material with melted asphalt, violently agitating the mixture so as to disintegrate the waste material and to mix thoroughly the ingredients of the waste material with the asphalt, said agitating continuing for a period of sufficient duration to eliminate objectionable scum or foam, and adding a filler material to produce a mastic of the desired constituency.

6. The method of reclaiming waste material resulting from the manufacture of asphalt shingles, asphalt roofing and other fibrous materials including asphalt, including the steps of comminuting the waste material, intermixing the comminuted waste material with asphalt, violently agitating the mixture so as to disintegrate the waste material and to mix thoroughly the ingredients of the waste material with the asphalt, said agitating continuing for a period of sufficient duration to eliminate objectionable scum or foam, and adding a filler material to produce a mastic of the desired constituency.

7. The method of reclaiming waste material resulting from the manufacture of asphalt shingles, asphalt roofing and other fibrous materials including asphalt, including the steps of dividing the waste material into small particles, intermixing the divided material with melted asphalt, violently agitating the mixture so as to disintegrate the waste material, said agitating continuing for a period of sufficient duration to eliminate objectionable scum or foam, and grinding the mixture so as to comminute any solid particles found in the mixture.

8. A process for reclaiming waste material such as waste material obtained from the manufacture of asphalt shingles, said process including the steps of reducing the waste material in a plurality of reduction stages, separating the finely comminuted material from the coarse aggregate resulting from the first reduction stage, adding a filler material to the coarse aggregate supplied to the second reduction stage, separating the finer comminuted material from the coarse aggregate resulting from the second reduction stage, separating the filler material from the comminuted waste material resulting from the second reduction stage, and supplying the coarse aggregate and the separated filler material to the third stage for further reduction.

9. A process for reclaiming waste material such as waste material obtained from the manufacture of asphalt shingles, said process including the steps of reducing the waste material in a plurality of reduction stages, separating the finely comminuted material from the coarse aggregate after the first reduction stage, adding a filler material to the coarse aggregate supplied to the second reduction stage, separating the comminuted waste material from the coarse aggregate resulting from the second reduction stage, separating the filler material from the second reduction stage comminuted waste material, adding the separated filler material to the coarse aggregate and supplying this aggregate and filler material to the third reduction stage, separating the filler material from the comminuted material resulting from the third reduction stage, and returning the separated filler material for reuse with the coarse aggregate resulting from the first reduction stage.

10. A process for reclaiming waste material such as waste material obtained from the manufacture of asphalt shingles, said process including the steps of reducing the waste material in a plurality of reduction stages, separating the finely comminuted material from the coarse aggregate resulting from the first reduction stage, adding a filler material to the coarse aggregate supplied to the second reduction stage, supplying the finely comminuted material resulting from the several reduction stages to a batch of molten asphalt, and violently agitating the batch of molten asphalt having added thereto the finely comminuted material so as to disintegrate the comminuted waste material and so as to thoroughly mix the waste material with the molten asphalt, said agitating continuing for a period of sufficient duration to eliminate objectionable scum or foam.

11. A process for reclaiming waste material such as waste material obtained from the manufacture of asphalt shingles, said process including the steps of reducing the waste material in a plurality of successive reduction stages, separating the finely comminuted material from the coarse aggregate resulting from each of the stages, adding the finely comminuted material thus separated to a batch of molten asphalt, violently agitating the molten asphalt so as to thoroughly disintegrate the waste material, and so as to mix the disintegrated waste material with the molten asphalt, said agitating continuing for a period of sufficient duration to eliminate objectionable scum or foam.

12. A process for reclaiming waste material such as waste material obtained from the manufacture of asphalt shingles, said process including the steps of reducing the waste material in a plurality of successive reduction stages, separating the finely comminuted material from the coarse aggregate resulting from each of the stages, adding the finely comminuted material thus separated to a batch of molten asphalt, violently agitating the molten asphalt so as to thoroughly disintegrate the waste material and so as to mix the disintegrated waste material with the molten asphalt, said agitating extending over a period of sufficient duration to eliminate objectionable scum or foam, and further reducing the coarse aggregate resulting from each of the successive stages.

13. A process of reclaiming waste material having a granular surface such as waste material obtained from the manufacture of asphalt shingles, said process including the steps of reducing the waste material in a plurality of reduction stages wherein the granular material found on the surface of the waste material functions as a lubricant in the first stage, separating the coarse aggregate from the comminuted material resulting from the first stage, supplying a mineral filler material to the coarse aggregate which filler material functions as a lubricant, feeding the coarse aggregate and the filler material to the second reduction stage, separating the coarse aggregate from the comminuted material resulting from the second reduction stage, adding a filler material to the coarse aggregate resulting from the second stage, and supplying this coarse aggregate with its filler material to the third reduction stage for further reduction.

14. A process of reclaiming waste material having a granular surface such as waste material obtained from the manufacture of asphalt shingles, said process including the steps of reducing the waste material in a plurality of reduction stages wherein the granular material found on the surface of the waste material functions as a lubricant in the first stage, separating the coarse aggregate from the comminuted material resulting from the first stage, supplying a mineral filler material to the coarse aggregate which filler material functions as a lubricant, feeding the coarse aggregate and the filler material to the second reduction stage, separating the coarse aggregate from the comminuted material resulting from the second reduction stage, adding a filler material to the coarse aggregate resulting from the second stage, supplying this coarse aggregate with the filler material to the third reduction stage for further reduction, and cooling the waste material as it advances through the third reduction stage.

15. A process of reclaiming waste material having a granular surface such as waste material obtained from the manufacture of asphalt shingles, said process including the steps of reducing the waste material in a plurality of reduction stages wherein the granular material found on the surface of the waste material functions as a lubricant in the first stage, separating the coarse aggregate from the comminuted material resulting from the first stage, supplying a mineral filler material to the coarse aggregate which filler material functions as a lubricant, feeding the coarse aggregate and the filler material to the second reduction stage, separating the coarse aggregate from the comminuted material resulting from the second reduction stage, adding a filler material to the coarse aggregate resulting from the second stage, supplying this coarse aggregate with the filler material to the third reduction stage for further reduction, cooling the waste material as it advances through the third reduction stage, adding the finely comminuted material resulting from the several reduction stages to a batch of molten asphalt and thoroughly intermixing the finely comminuted waste material with the asphalt.

16. A process of reclaiming waste material having a granular surface such as waste material obtained from the manufacture of asphalt shingles, said process including the steps of reducing the waste material in a plurality of reduction stages wherein the granular material found on the surface of the waste material functions as a lubricant in the first stage, separating the coarse aggregate from the comminuted material resulting from the first stage, supplying a mineral filler material to the coarse aggregate which filler material functions as a lubricant, feeding the coarse aggregate and the filler material to the second reduction stage, separating the coarse aggregate from the comminuted material resulting from the second reduction stage, adding a filler material to the coarse aggregate resulting from the second stage, supplying this coarse aggregate with the filler material to the third reduction stage for further reduction, cooling the waste material as it advances through the third reduction stage, reclaiming the filler material from the finely comminuted material resulting from the second and third stages, adding the finely comminuted material resulting from the several reduction stages to a batch of molten asphalt and thoroughly intermixing the finely comminuted waste material with the asphalt.

KENNETH GUY MINGE.
CHARLES E. MINGE.